United States Patent
Zhang et al.

(10) Patent No.: US 10,409,684 B2
(45) Date of Patent: Sep. 10, 2019

(54) METHOD, DEVICE AND STORAGE MEDIUM FOR CLEANING MEMORY

(71) Applicant: Beijing Xiaomi Mobile Software Co., Ltd., Haidian District, Beijing (CN)

(72) Inventors: Xiaoliang Zhang, Beijing (CN); Hao Yan, Beijing (CN); Ren Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 156 days.

(21) Appl. No.: 15/499,868

(22) Filed: Apr. 27, 2017

(65) Prior Publication Data

US 2017/0315870 A1 Nov. 2, 2017

(30) Foreign Application Priority Data

Apr. 29, 2016 (CN) .......................... 2016 1 0282786

(51) Int. Cl.
| | | |
|---|---|---|
| G06F 11/00 | (2006.01) | |
| G06F 11/14 | (2006.01) | |
| G06F 1/30 | (2006.01) | |
| G06F 11/07 | (2006.01) | |
| G06F 9/48 | (2006.01) | |
| G06F 12/08 | (2016.01) | |

(52) U.S. Cl.
CPC .............. *G06F 11/142* (2013.01); *G06F 1/30* (2013.01); *G06F 9/485* (2013.01); *G06F 11/0757* (2013.01); *G06F 11/0793* (2013.01); *G06F 12/08* (2013.01); *G06F 2201/805* (2013.01); *G06F 2201/81* (2013.01)

(58) Field of Classification Search
CPC .............. G06F 9/5022; G06F 11/0757; G06F 11/0793; G06F 11/30; G06F 3/0652
See application file for complete search history.

(56) References Cited

U.S. PATENT DOCUMENTS

| | | | |
|---|---|---|---|
| 6,115,703 A | 9/2000 | Bireley | |
| 2005/0188163 A1* | 8/2005 | Asthana | .................... G06F 8/62 711/159 |
| 2005/0193066 A1* | 9/2005 | Adams | ................... G06F 9/542 709/206 |
| 2007/0157001 A1 | 7/2007 | Ritzau | |

(Continued)

FOREIGN PATENT DOCUMENTS

| | | |
|---|---|---|
| CN | 102984580 A | 3/2013 |
| CN | 103324575 A | 9/2013 |

(Continued)

OTHER PUBLICATIONS

Extended European Search Report in European application No. 17156301.8, dated Aug. 25, 2017.

(Continued)

*Primary Examiner* — Charles Ehne
(74) *Attorney, Agent, or Firm* — Jun He Law Offices P.C.; James J. Zhu

(57) ABSTRACT

A method, a device and a storage medium for cleaning a memory are provided. The method includes that: a preset level corresponding to a detected hang state is determined; a cleaning mode corresponding to the preset level is determined; and an application program running in a memory is cleaned according to the cleaning mode.

11 Claims, 6 Drawing Sheets

(56) References Cited

U.S. PATENT DOCUMENTS

| | | | | |
|---|---|---|---|---|
| 2015/0331612 A1* | 11/2015 | Qiao | ..................... | G06F 12/023 |
| | | | | 711/166 |
| 2016/0004574 A1* | 1/2016 | Liu | ........................ | G06F 9/485 |
| | | | | 718/104 |
| 2016/0350296 A1* | 12/2016 | Li | ........................ | G06F 9/5022 |
| 2016/0378587 A1* | 12/2016 | Zhang | ................ | G06F 11/0757 |
| | | | | 714/55 |

FOREIGN PATENT DOCUMENTS

| | | |
|---|---|---|
| CN | 104199781 A | 12/2014 |
| CN | 104536907 A | 4/2015 |
| CN | 104714874 A | 6/2015 |
| CN | 105094936 A | 11/2015 |
| CN | 105242973 A | 1/2016 |

OTHER PUBLICATIONS

Notification of the First Office Action of Chinese application No. 201610282786.X with English translation, dated Dec. 27, 2017.
International Search Report in international application No. PCT/CN2016/095983, dated Jan. 25, 2017.
The Written Opinion of the International Search Authority in international application No. PCT/CN2016/095983, dated Jan. 25, 2017.

* cited by examiner

METHOD, DEVICE AND STORAGE MEDIUM FOR CLEANING MEMORY

CROSS-REFERENCE TO RELATED APPLICATIONS

This application is filed based upon and claims priority to Chinese Patent Application No. 201610282786.X, filed on Apr. 29, 2016, the entire contents of which are incorporated herein by reference.

TECHNICAL FIELD

The embodiments of the present disclosure generally relate to the technical field of terminals, and more particularly, to a method, a device and a storage medium for cleaning a memory.

BACKGROUND

When a user uses a mobile phone for a long time, the user usually may continuously initiate new application programs and forget to close the application programs, which are supposed to be closed. If the user forgets to close the application programs, a memory of the mobile phone may hang up due to the fact that too many application programs have been initiated, which will bring poor experiences to the user.

SUMMARY

According to a first aspect of embodiments of the present disclosure, there is provided a method for cleaning a memory. The method includes: determining a preset level corresponding to a detected hang state; determining a cleaning mode corresponding to the preset level; and cleaning an application program running in the memory according to the cleaning mode.

According to a second aspect of embodiments of the present disclosure, there is provided a device for cleaning a memory. The device includes: a processor; and a memory configured to store instructions executable by the processor, wherein the processor is configured to: determine a preset level corresponding to a detected hang state; determine a cleaning mode corresponding to the preset level; and clean an application program running in the memory according to the cleaning mode.

According to a third aspect of embodiments of the present disclosure, there is provided a non-transitory computer-readable storage medium having stored therein instructions that, when executed by a processor of an electronic device, causes the electronic device to perform a method for cleaning a memory. The method includes: determining a preset level corresponding to a detected hang state; determining a cleaning mode corresponding to the preset level; and cleaning an application program running in the memory according to the cleaning mode.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the present disclosure. Instead, they are merely examples of devices and methods consistent with some aspects related to the present disclosure as recited in the appended claims.

Figure 1:
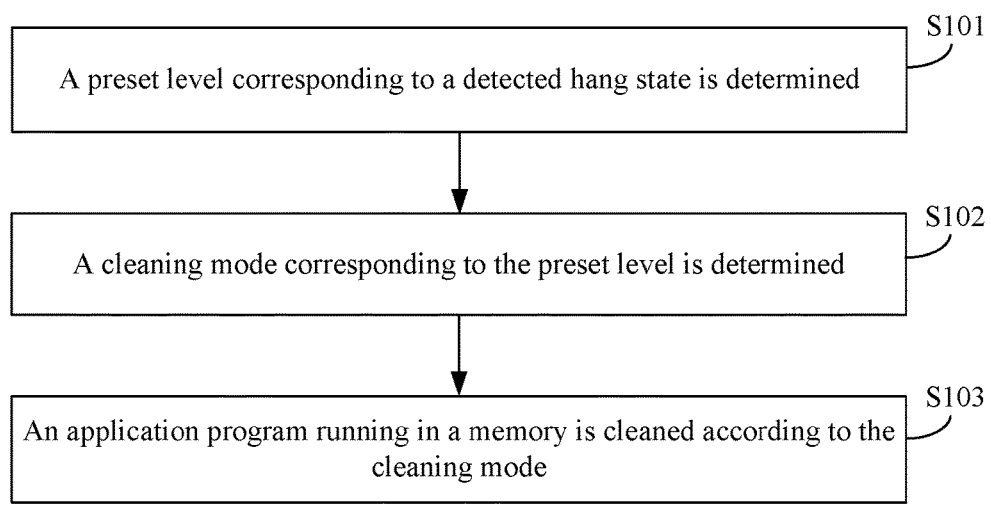
FIG. 1 is a flow chart showing a method for cleaning a memory, according to an exemplary embodiment.

FIG. 1 is a flow chart showing a method for cleaning a memory, according to an exemplary embodiment. The method for cleaning a memory may be applied to electronic device (for example, a smart phone and a tablet computer), and as shown in FIG. 1, the method for cleaning a memory includes the following Step 101 to Step 103.

Step 101: a preset level corresponding to a detected hang state is determined.

Step 102: a cleaning mode corresponding to the preset level is determined.

Step 103: an application program running in the memory is cleaned according to the cleaning mode.

In Step 101, in an embodiment, the preset level may be set for the hang state of the electronic device according to a number of occurrences of hang of the electronic device. For example, the corresponding preset level is a first level when it is detected that hang occurs once, the corresponding preset level is a second level if a number of occurrences of hang within a first preset time period from the time when a hang occurs at a first time is smaller than 3, and the corresponding preset level is a third level if the number of occurrences of hang within the first preset time period from the time when the hang occurs at a first time is equal to or greater than 3.

In Step 102, in an embodiment, the cleaning mode corresponds to the preset level, and different corresponding cleaning modes may be determined according to different corresponding levels of the hang state. For example, the cleaning mode may be a first cleaning mode if the preset level is the first level, the cleaning mode may be a second cleaning mode if the preset level is the second level, and the cleaning mode may be a third cleaning mode if the preset level is the third level.

In Step 103, for example, in the first cleaning mode, a foreground application or an application program of which running time is within a set time period (for example, within 10 seconds from the time when the application program is initiated) in the electronic device doesn't need to be cleaned, a cache of an application program recorded in a white list is cleaned, an application program provided by a third party is controlled to stop running, and caches of other application programs are cleaned. In Step 103, in the second cleaning mode, the foreground application or the application program of which running time is within the set time period (for example, within 10 seconds from the time when the application program is initiated) in the electronic device doesn't need to be cleaned, the cache of the application program recorded in the white list is cleaned, an application program which is automatically initiated is closed, the application program provided by the third party is controlled to stop running, and the caches of the other application programs are cleaned. In addition, in Step 103, in the third cleaning mode, the foreground application or the application program of which running time is within the set time period (for example, within 10 seconds from the time when the application program is initiated) in the electronic device doesn't need to be cleaned, the cache of the application program recorded in the white list is cleaned, the application program which is automatically initiated is closed, the application program provided by the third party is controlled to stop running, and the other application programs are closed.

In the embodiment, the cleaning mode is determined according to the preset level corresponding to the hang state, and the application program running in the memory is cleaned according to the cleaning mode. If many application programs are initiated in the electronic device, a corresponding cleaning mode may be selected according to a degree of the hang state to clean unnecessary application programs without perception of a user. Thus, the electronic device may run more smoothly, and experiences of the user may be improved.

In an embodiment, the step that the preset level corresponding to the detected hang state is determined may include: when a first occurrence of a hang state of the electronic device is detected, it is determined that the preset level corresponding to the detected hang state is a first level; a number of occurrences of the hang state of the electronic device is counted within a first preset time period from a time point corresponding to the first occurrence of the hang state; it is determined whether the number is greater than or equal to a preset number threshold value corresponding to a second level; and when the number is greater than or equal to the preset number threshold value, it is determined that the preset level corresponding to the detected hang state is the second level.

In an embodiment, the step that the cleaning mode corresponding to the preset level is determined may include: when the hang state corresponds to the first level, a first cleaning mode corresponding to the first level is determined; and when the hang state corresponds to the second level, a second cleaning mode corresponding to the second level is determined.

In an embodiment, the step that the application program running in the memory is cleaned according to the cleaning mode may include: respective program types corresponding to a plurality of application programs running in the memory are determined; respective processing manners corresponding to the plurality of application programs in the cleaning mode are determined according to the respective program types; and running states corresponding to the plurality of application programs running in the memory are controlled according to the processing manners.

In an embodiment, when the program types are application programs recorded in a white list, the processing manners are closing or stopping the running application programs, and the step that the running states corresponding to the plurality of application programs running in the memory are controlled according to the processing manners may include: a preset memory threshold value for the running application program that needs to be closed or stopped is determined form the white list, and the preset memory threshold value is a memory value that allows the running application program to consume under memory capacity of the electronic device; and when a memory currently consumed by the application program that needs to be closed or stopped is greater than the preset memory threshold value, the application program is controlled to be closed or stopped.

In an embodiment, the method may further include: the white list is acquired from a server, wherein the white list is configured to record preset memory threshold values corresponding to a plurality of application programs and obtained by performing statistics, under different memory capacities.

For the details of the cleaning of the memory, please refer to subsequent embodiments.

In such a manner, according to the method provided by the embodiments of the present disclosure, the corresponding cleaning mode may be selected according to the degree of the hang state to clean the unnecessary application programs without perception of the user, so that the electronic device may run more smoothly, and the experiences of the user may be improved.

The technical solutions provided by the embodiments of the present disclosure will be described below with specific embodiments.

Figure 2:
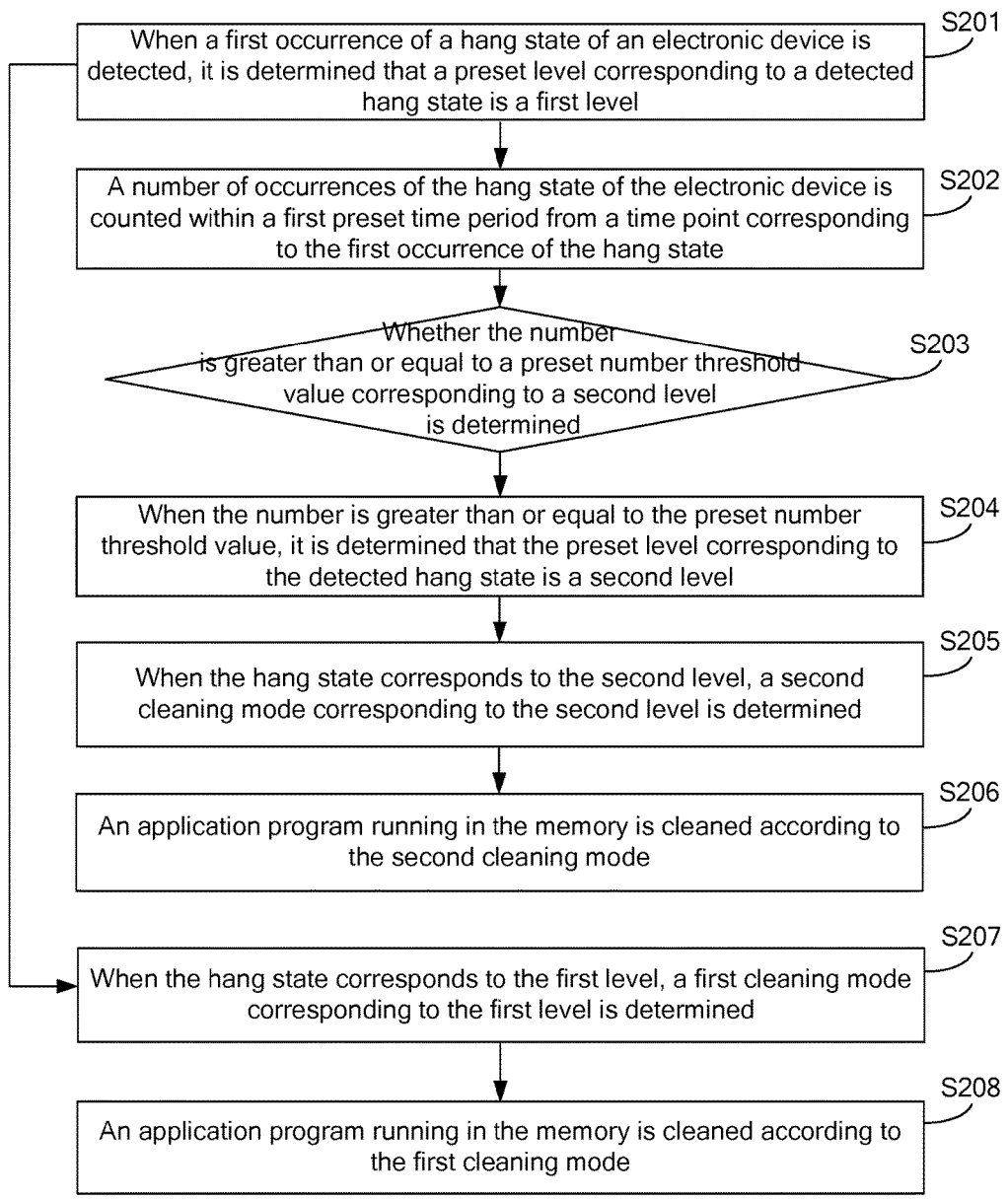
FIG. 2 is a flow chart showing a method for cleaning a memory, according to another exemplary embodiment.

FIG. 2 is a flow chart showing a method for cleaning a memory, according to an exemplary embodiment. By using the method provided by the embodiment of the present disclosure, exemplary descriptions are made by taking how to determine a preset level and how to clean an application program according to a cleaning mode as examples in the embodiment, and as shown in FIG. 2, the method includes the following steps.

Step 201: when an first occurrence of a hang state of an electronic device is detected, it is determined that a preset level corresponding to a detected hang state is a first level, and Step 202 and Step 207 may be performed simultaneously.

Step 202: a number of occurrences of the hang state of the electronic device is counted within a first preset time period from a time point corresponding to the first occurrence of the hang state, and Step 203 is performed.

Step 203: it is determined whether the number is greater than or equal to a preset number threshold value corresponding to a second level, Step 204 is performed when the number is greater than or equal to the preset number threshold value, and the hang state is continued to be detected when the number is lower than the preset number threshold value.

Step 204: when the number is greater than or equal to the preset number threshold value, it is determined that the preset level corresponding to the detected hang state is a second level, and Step 205 is performed.

Step 205: when the hang state corresponds to the second level, a second cleaning mode corresponding to the second level is determined, and Step 206 is performed.

Step 206: an application program running in a memory is cleaned according to the second cleaning mode, and the flow is ended.

Step 207: when the hang state corresponds to the first level, a first cleaning mode corresponding to the first level is determined, and Step 208 is performed.

Step 208: the application program running in the memory is cleaned according to the first cleaning mode, and the flow is ended.

In Step 201, in an embodiment, the first level may be a level indicating that the hang state is slight.

In Step 202, in an embodiment, for example, the first occurrence of the hang state of the electronic device occurs at 10:11, the hang of the electronic device may be continued to be detected to count the number of occurrences of the hang state of the electronic device within 20 minutes from 10:11, and for example, the number of occurrences of the hang state is 1.

In Step 203, in an embodiment, the preset number threshold value may be set according to memory capacity of the electronic device. For example, the corresponding preset number threshold value is 1 when the memory capacity of the electronic device is 1G, the corresponding preset number threshold value is 2 when the memory capacity of the electronic device is 2G, and the corresponding preset number threshold value is 3 when the memory capacity of the electronic device is 3G. If the memory capacity of the electronic device is higher, it is indicated that the number of application programs capable of running at the same time is larger.

In Step 204 to Step 206, when the number is greater than or equal to the preset number threshold value, it is determined that the preset level corresponding to the detected hang state is the second level, which indicates that a burden of running application programs in the memory of the electronic device is increased. In such case, a cleaning manner of the first cleaning mode is insufficient to avoid the hang state of the electronic device, and at this moment, the application program running in the memory is cleaned according to the second cleaning mode corresponding to the second level. For example, a cache of an application program recorded in a white list is cleaned, an application program which is automatically initiated is closed, an application program provided by a third party is controlled to be stopped, and caches of other application programs are cleaned.

In Step 207 to Step 208, for descriptions about the operation that the application program running in the memory is cleaned according to the first cleaning mode corresponding to the first level, please refer to descriptions in the embodiment shown in FIG. 1, which will not be elaborated in the present embodiment.

According to the embodiment, a degree of the hang state is graded, and the application program running in the memory is cleaned according to the cleaning modes corresponding to different levels, so that different application programs may be cleaned in different levels for different hang states, and cleaning operations over the application programs are detailed.

Figure 3A:
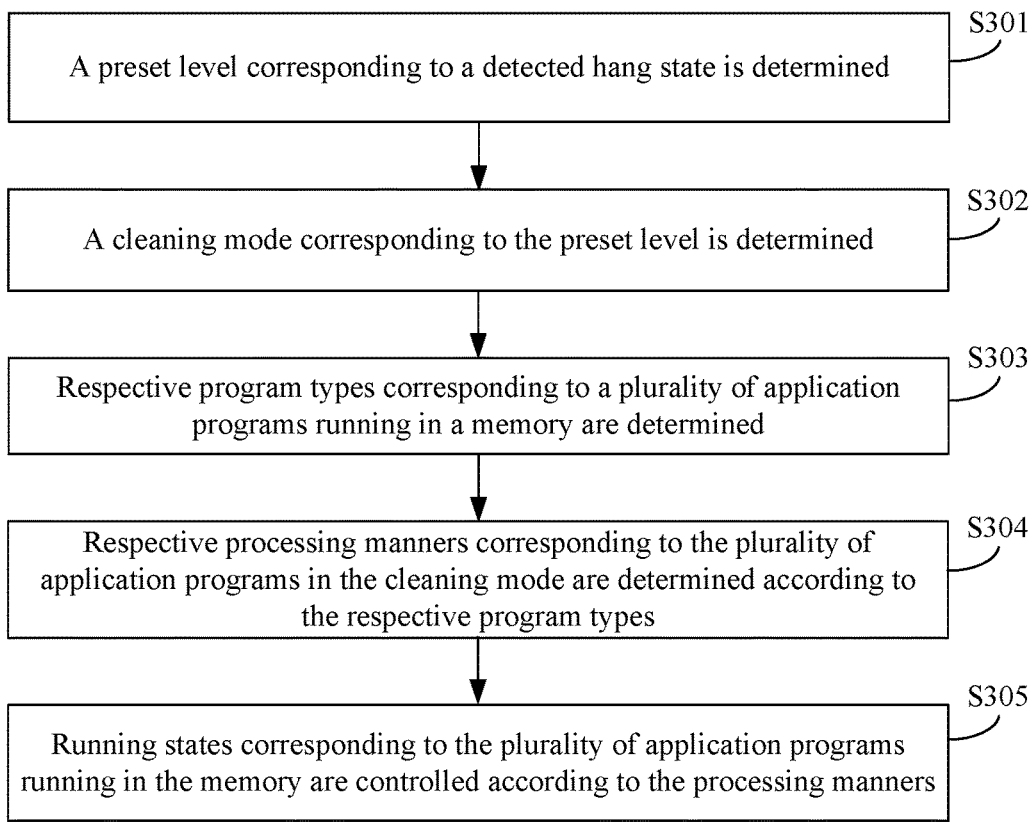
FIG. 3A is a flow chart showing a method for cleaning a memory, according to another exemplary embodiment.
Figure 3B:
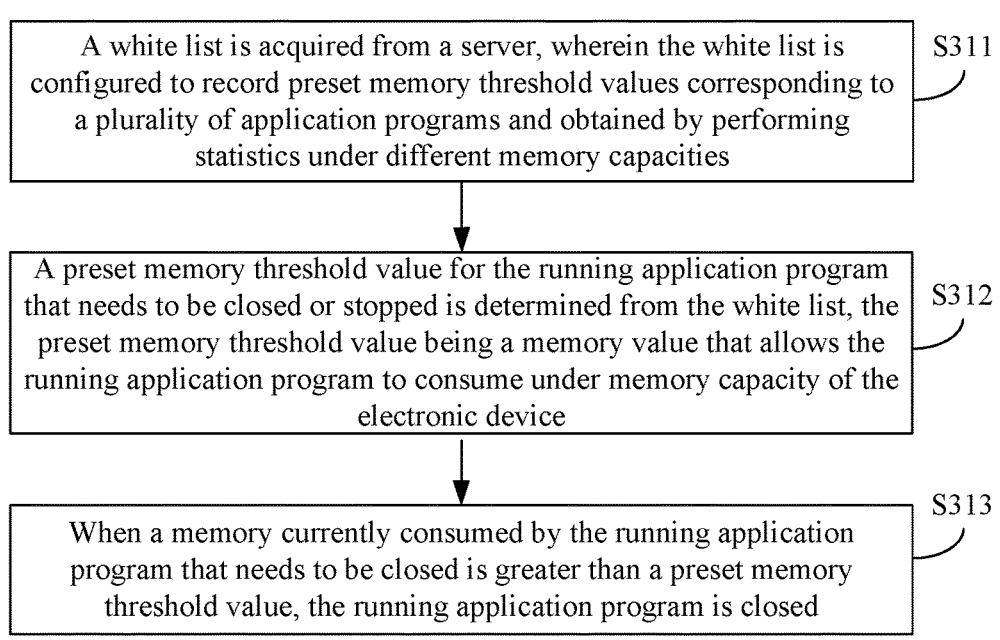
FIG. 3B is a flow chart showing cleaning of an application program of which a program type is an application program recorded in a white list, according to an exemplary embodiment.

FIG. 3A is a flow chart of a method for cleaning a memory, according to another exemplary embodiment, and FIG. 3B is a flow chart showing cleaning of an application program of which a program type is an application program recorded in a white list, according to another exemplary embodiment. By using the method provided by the embodiment of the present disclosure, exemplary descriptions are made by taking how to clean an application program running in a memory according to a cleaning mode as an example in the embodiment, and as shown in FIG. 3A, the method includes the following steps.

Step 301: a preset level corresponding to a detected hang state is determined.

Step 302: a cleaning mode corresponding to the preset level is determined.

Step 303: respective program types corresponding to a plurality of application programs running in a memory are determined.

Step 304: respective processing manners corresponding to plurality of application programs in the cleaning mode are determined according to the respective program types.

Step 305: running states corresponding to the plurality of application programs running in the memory are controlled according to the processing manners.

For the descriptions about Step 301 and Step 302, please refer to descriptions in the embodiment shown in FIG. 1, which will not be elaborated herein.

In Step 303, in an embodiment, the program types may include: a foreground application, an application program of which running time is within a set time period (for example, within 10 seconds from the time when the application program is initiated), an application program recorded in a white list, an application program provided by a third party, an application program locked by a user and a system, an application program which is automatically initiated, other application programs not listed in the above types, and the like.

In Step 304 and Step 305, in an embodiment, the processing manners may include: cleaning a cache of an application program, closing the application program, controlling the running application program to be stopped and the like. For example, the plurality of application programs running in the memory includes an application program A, an application program B, an application program C and an application program D. The application program A is an application program of a foreground application, the application program B is an application program recorded in the white list, the application program C is an application program provided by the third party, and the application program D is an application program which is automatically initiated. When the cleaning mode is the first cleaning mode, the application program A doesn't need to be cleaned, a cache of the application program B is cleaned, the running application program C is controlled to be stopped, and a cache of the application program D is cleaned. In the second cleaning mode, the application program A doesn't need to be cleaned, the cache of the application program B is cleaned, the running application program C is controlled to be stopped, and the application program D is closed.

As shown in FIG. 3B, when the program types are application programs recorded in the white list, the processing manners are closing or stopping the running application programs, exemplary descriptions are made by taking closing the application programs recorded in the white list as an example, and Step 305 may include Step 311 to Step 313.

Step 311: the white list is acquired from a server, wherein the white list is configured to record preset memory threshold values corresponding to a plurality of application programs and obtained by performing statistics, under different memory capacities.

Step 312: a preset memory threshold value for the running application program that needs to be closed or stopped is determined from the white list, and the preset memory threshold value is a memory value that allows the running application program to consume under memory capacity of the electronic device.

Step 313: when a memory currently consumed by the running application program that needs to be closed is greater than the preset memory threshold value, the running application program is closed.

In Step 311, the white list may be obtained by performing statistics on occurrences of hang in processes of massive users using electronic devices, and the white list may record preset content threshold values of the application programs and is obtained by performing statistics, during occurrences of hang under different memory capacities.

For example, for a map application program, a preset memory threshold value recorded in the white list is 100M, and when memory capacity of the map application program exceeds 100M during running, the map application program may be closed. A manner of controlling the running application programs recorded in the white list to be stopped is similar to the above-mentioned manner, and will not be elaborated herein.

According to the embodiment, the respective processing manners corresponding to the plurality of application programs in the cleaning mode are determined according to the respective program types of the plurality of application programs running in the memory, so that different cleaning strategies may be adopted for different application programs, cleaning of the application programs of different programs types may be more detailed, and it is ensured that a user may normally use the electronic device.

Figure 4:
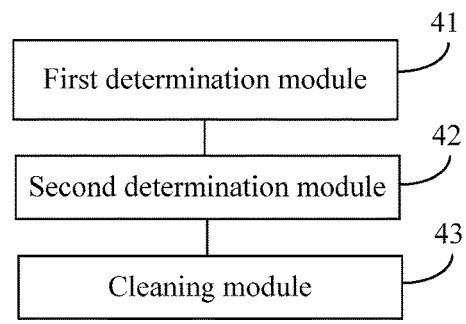
FIG. 4 is a block diagram showing a device for cleaning a memory, according to an exemplary embodiment.

FIG. 4 is a block diagram showing a device for cleaning a memory, according to an exemplary embodiment, and as shown in FIG. 4, the device for cleaning a memory includes a first determination module 41, a second determination module 42 and a cleaning module 43.

The first determination module 41 is configured to determine a preset level corresponding to a detected hang state.

The second determination module 42 is configured to determine a cleaning mode corresponding to the preset level determined by the first determination module 41.

The cleaning module 43 is configured to clean an application program running in a memory according to the cleaning mode determined by the second determination module 42.

Figure 5:
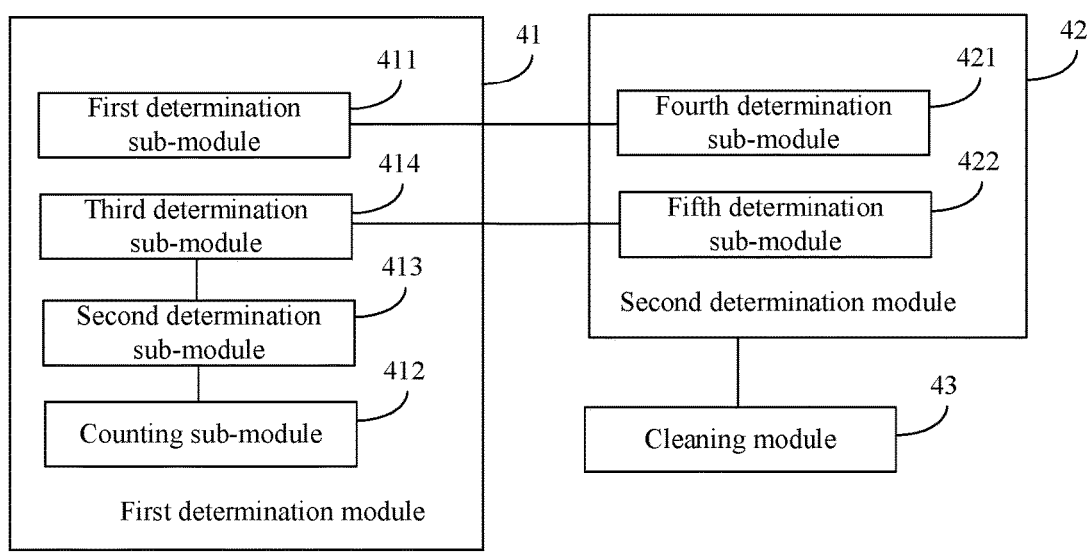
FIG. 5 is a block diagram showing a device for cleaning a memory, according to another exemplary embodiment.

FIG. 5 is a block diagram showing a device for cleaning a memory, according to another exemplary embodiment, and as shown in FIG. 5, based on the embodiment shown in FIG. 4, in an embodiment, the first determination module 41 may include a first determination sub-module 411, a counting sub-module 412, a second determination sub-module 413 and a third determination sub-module 414.

The first determination sub-module 411 is configured to, when a first occurrence of a hang state of an electronic device is detected, determine that the preset level corresponding to the detected hang state is a first level.

The counting sub-module 412 is configured to count a number of occurrences of the hang state of the electronic device within a first preset time period from a time point corresponding to the first occurrence of the hang state.

The second determination sub-module 413 is configured to determine whether the number counted by the counting sub-module 412 is greater than or equal to a preset number threshold value corresponding to a second level.

The third determination sub-module 414 is configured to, when the second determination sub-module 413 determines that the number is greater than or equal to the preset number threshold value, determine that the preset level corresponding to the detected hang state is the second level.

In an embodiment, the second determination module 42 may include a fourth determination sub-module 421 and a fifth determination sub-module 422.

The fourth determination sub-module 421 is configured to, when the hang state corresponds to the first level determined by the first determination sub-module 411, determine a first cleaning mode corresponding to the first level.

The fifth determination sub-module 422 is configured to, when the hang state corresponds to the second level determined by the third determination sub-module 414, determine a second cleaning mode corresponding to the second level.

Figure 6:
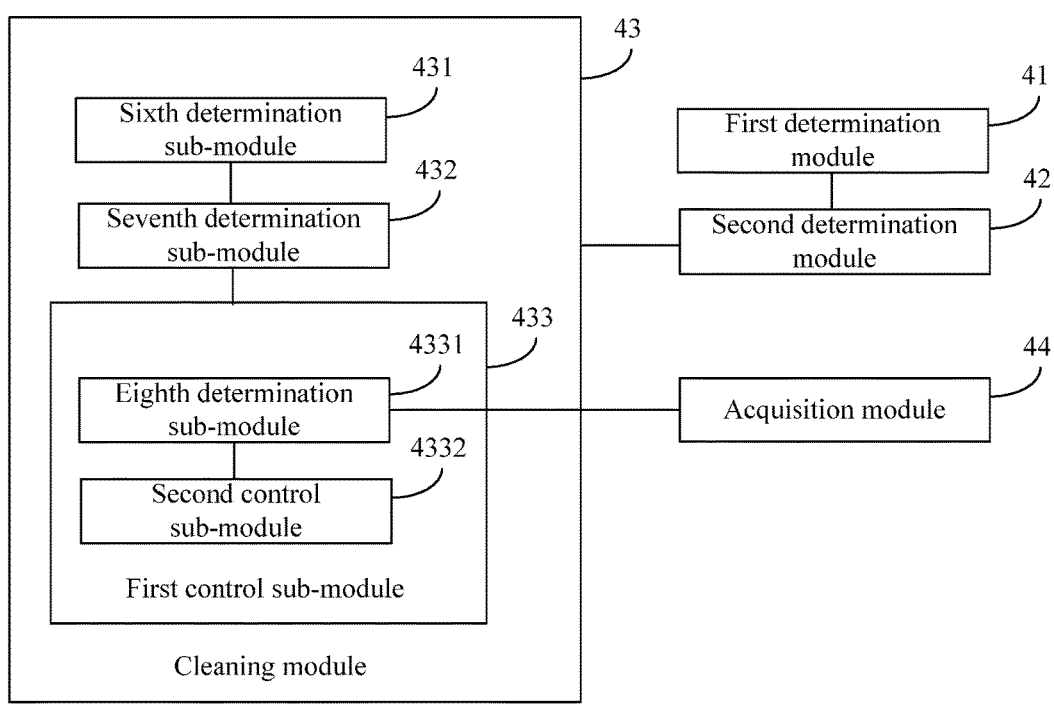
FIG. 6 is a block diagram showing a device for cleaning a memory, according to another exemplary embodiment.

FIG. 6 is a block diagram showing a device for cleaning a memory, according to another exemplary embodiment, and as shown in FIG. 6, based on the embodiment shown in FIG. 4 or FIG. 5, in an embodiment, the cleaning module 43 may include a sixth determination sub-module 431, a seventh determination sub-module 432 and a first control sub-module 433.

The sixth determination sub-module 431 is configured to determine respective program types corresponding to a plurality of application programs running in the memory.

The seventh determination sub-module 432 is configured to determine respective processing manners corresponding to the plurality of application programs in the cleaning mode according to the respective program types determined by the sixth determination sub-module 431.

The first control sub-module 433 is configured to control running states corresponding to the plurality of application programs running in the memory according to the processing manners determined by the seventh determination sub-module 432.

In an embodiment, when the program types are application programs recorded in a white list, the processing manners are closing or stopping the running application programs, and the first control sub-module 433 may include an eighth determination sub-module 4331 and a second control sub-module 4332.

The eighth determination sub-module 4331 is configured to determine, from the white list, a preset memory threshold value for the running application program that needs to be closed or stopped, and the preset memory threshold value is a memory value that allows the running application program to consume under memory capacity of the electronic device.

The second control sub-module 4332 is configured to, when the eighth determination sub-module 4331 determines that a memory currently consumed by the running application program that needs to be closed or stopped is greater than the preset memory threshold value, control to close or stop the running application program.

In an embodiment, the device may further include an acquisition module 44.

The acquisition module 44 is configured to acquire the white list from a server, wherein the white list is configured to record preset memory threshold values corresponding to a plurality of application programs and obtained by performing statistics under different memory capacities. The eighth determination sub-module 4331 determines, from the white list acquired by the acquisition module 44, the preset memory threshold value of the memory allowed to be occupied by the application program required to be closed or stopped under the memory capacity of the electronic device.

With respect to the devices in the above embodiments, the specific manners in which the respective modules perform operations have been described in detail in the embodiments regarding the methods, which will not be elaborated herein.

Figure 7:
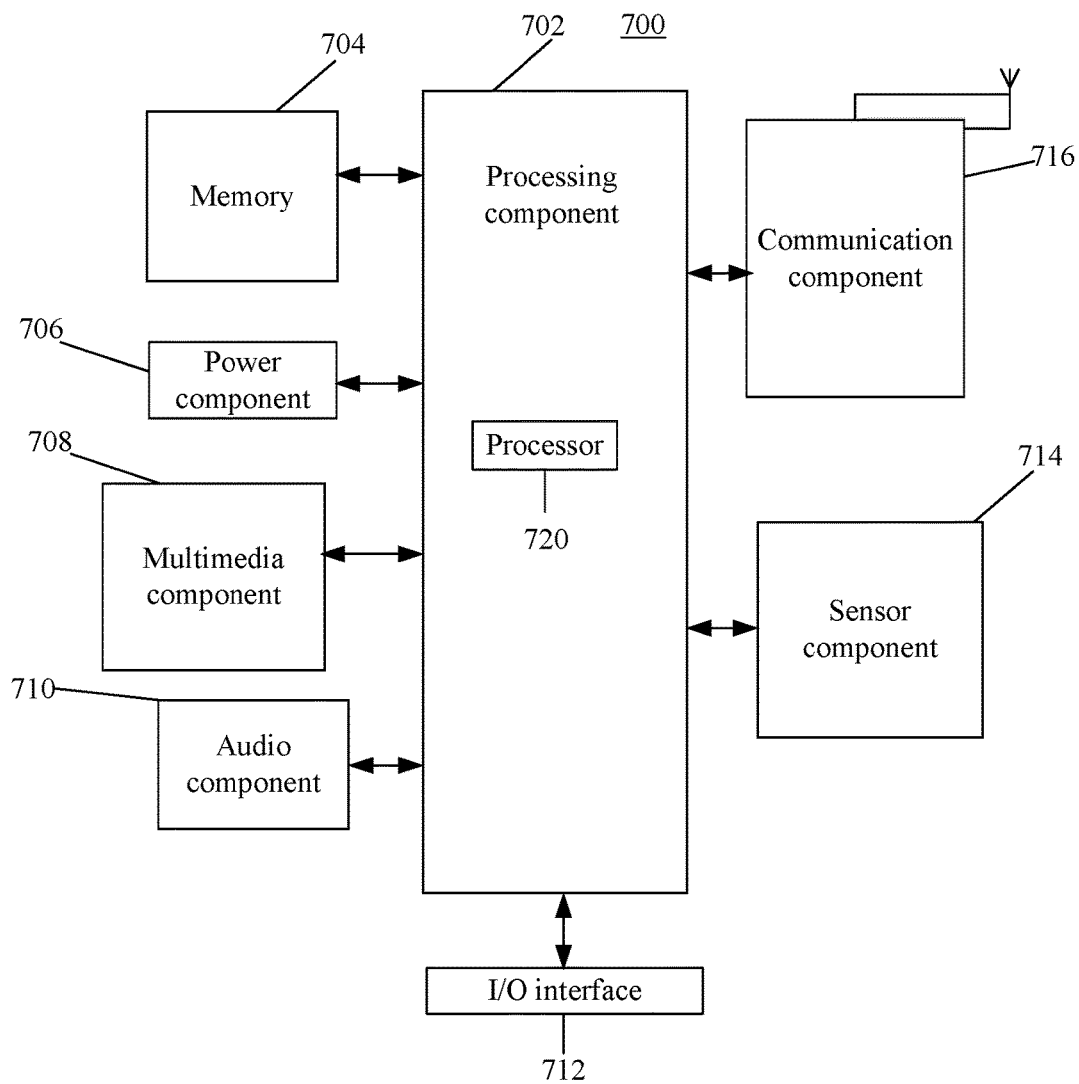
FIG. 7 is a block diagram showing a device for cleaning a memory, according to an exemplary embodiment.

FIG. 7 is a block diagram showing a device for cleaning a memory, according to an exemplary embodiment. For example, the device 700 may be a mobile phone, a computer, a digital broadcast terminal, a messaging device, a gaming console, a tablet, a medical device, an exercise device, a Personal Digital Assistant and the like.

Referring to FIG. 7, the device 700 may include one or more of the following components: a processing component 702, a memory 704, a power component 706, a multimedia component 708, an audio component 710, an Input/Output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above-mentioned method. Moreover, the processing component 702 may include one or more modules which facilitate interaction between the processing component 702 and the other components. For instance, the processing component 702 may include a multimedia module to facilitate interaction between the multimedia component 708 and the processing component 702.

The memory 704 is configured to store various types of data to support the operation of the device 700. Examples of such data include instructions for any application programs or methods operated on the device 700, contact data, phonebook data, messages, pictures, video, etc. The memory 704 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 706 provides power for various components of the device 700. The power component 706 may include a power management system, one or more power supplies, and other components associated with the generation, management and distribution of power for the device 700.

The multimedia component 708 includes a screen providing an output interface between the device 700 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 708 includes a front camera and/or a rear camera. The front camera and/or the rear camera may receive external multimedia data when the device 700 is in an operation mode, such as a photographing mode or a video mode. Each of the front camera and the rear camera may be a fixed optical lens system or have capabilities of focusing and optical zooming.

The audio component 710 is configured to output and/or input an audio signal. For example, the audio component 710 includes a Microphone (MIC) which is configured to receive an external audio signal when the device 700 is in the operation mode, such as a call mode, a recording mode and a voice recognition mode. The received audio signal may be further stored in the memory 704 or sent through the communication component 716. In some embodiments, the audio component 710 further includes a speaker configured to output the audio signal.

The I/O interface 712 provides an interface between the processing component 702 and a peripheral interface module, and the peripheral interface module may be a keyboard, a click wheel, a button and the like. The button may include, but not limited to, a home button, a volume button, a starting button and a locking button.

The sensor component 714 includes one or more sensors configured to provide status assessment in various aspects for the device 700. For instance, the sensor component 714 may detect an on/off status of the device 700 and relative positioning of components, such as a display and keypad of the device 700, and the sensor component 714 may further detect a change in a position of the device 700 or a component of the device 700, presence or absence of contact between the user and the device 700, orientation or acceleration/deceleration of the device 700 and a change in temperature of the device 700. The sensor component 714 may include a proximity sensor configured to detect presence of an object nearby without any physical contact. The sensor component 714 may also include a light sensor, such as a Complementary Metal Oxide Semiconductor (CMOS) or Charge Coupled Device (CCD) image sensor, configured for use in an imaging application. In some embodiments, the sensor component 714 may also include an acceleration sensor, a gyroscope sensor, a magnetic sensor, a pressure sensor or a temperature sensor.

The communication component 716 is configured to facilitate wired or wireless communication between the device 700 and another device. The device 700 may access a communication-standard-based wireless network, such as a Wireless Fidelity (WiFi) network, a $2^{nd}$-Generation (2G) or $3^{rd}$-Generation (3G) network or a combination thereof In an exemplary embodiment, the communication component 716 receives a broadcast signal or broadcast associated information from an external broadcast management system through a broadcast channel. In an exemplary embodiment, the communication component 716 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In an exemplary embodiment, there is also provided a non-transitory computer-readable storage medium containing instructions, such as the memory 704 containing instructions, and the instructions may be executed by the processor 720 of the device 700 to implement the above-mentioned method. For example, the non-transitory computer-readable storage medium may be a ROM, a Compact Disc Read-Only Memory (CD-ROM), a magnetic tape, a floppy disc, an optical data storage device and the like.

Other implementations of the embodiments of the present disclosure will be easily conceived by those skilled in the art from consideration of the specification and practice of the present disclosure. This application is intended to cover any variations, uses, or adaptations of the embodiments of the present disclosure following the general principles of the embodiments of the present disclosure and including common knowledge or conventional technical means in the prior art which is not disclosed by the embodiments of the present disclosure. It is intended that the specification and embodiments be considered as exemplary only, and a true scope and spirit of the embodiments of the present disclosure are defined by the following claims.

It will be appreciated that the embodiments of the present disclosure are not limited to the exact construction that has been described above and illustrated in the accompanying drawings, and that various modifications and changes may be made without departing from the scope thereof. It is intended that the scope of the embodiments of the present disclosure is only limited by the appended claims.

What is claimed is:

1. A method for cleaning a memory, comprising:
   determining a preset level corresponding to a detected hang state;
   determining a cleaning mode corresponding to the preset level; and
   cleaning an application program running in the memory according to the cleaning mode;
   wherein cleaning the application program running in the memory according to the cleaning mode comprises:
   determining respective program types corresponding to a plurality of application programs running in the memory;
   determining respective processing manners corresponding to the plurality of application programs in the cleaning mode according to the respective program types; and
   controlling running states corresponding to the plurality of application programs running in the memory according to the respective processing manners.

2. The method according to claim 1, wherein determining the preset level corresponding to the detected hang state comprises:
   determining that the preset level corresponding to the detected hang state is a first level when a first occurrence of a hang state of an electronic device is detected;
   counting a number of occurrences of the hang state of the electronic device within a preset time period from a time point corresponding to the first occurrence of the hang state;
   determining whether the number is greater than or equal to a preset number threshold value corresponding to a second level; and
   determining that the preset level corresponding to the detected hang state is the second level when the number is greater than or equal to the preset number threshold value.

3. The method according to claim 2, wherein determining the cleaning mode corresponding to the preset level comprises:
   determining a first cleaning mode corresponding to the first level when the hang state corresponds to the first level; and
   determining a second cleaning mode corresponding to the second level when the hang state corresponds to the second level.

4. The method according to claim 1, wherein, when the program types are application programs recorded in a white list, the processing manners are closing or stopping the running application programs, and controlling the running states corresponding to the plurality of application programs running in the memory according to the respective processing manners comprises:
   determining, from the white list, a preset memory threshold value for the running application program that needs to be closed or stopped, the preset memory threshold value being a memory value that allows the running application program to consume under memory capacity of the electronic device; and
   closing or stopping the running application program when a memory currently consumed by the running application program that needs to be closed or stopped is greater than the preset memory threshold value.

5. The method according to claim 4, further comprising:
   acquiring the white list from a server, wherein the white list is configured to record preset memory threshold values corresponding to a plurality of application programs and obtained by performing statistics under different memory capacities.

6. A device for cleaning a memory, comprising:
   a processor; and
   a memory configured to store instructions executable by the processor,
   wherein the processor is configured to:
   determine a preset level corresponding to a detected hang state;
   determine a cleaning mode corresponding to the preset level; and
   clean an application program running in the memory according to the cleaning mode;
   wherein the processor configured to clean the application program running in the memory according to the cleaning mode is further configured to:
   determine respective program types corresponding to a plurality of application programs running in the memory;
   determine respective processing manners corresponding to the plurality of application programs in the cleaning mode according to the respective program types; and
   control running states corresponding to the plurality of application programs running in the memory according to the respective processing manners.

7. The device according to claim 6, wherein the processor configured to determine the preset level corresponding to the detected hang state is further configured to:
   determine that the preset level corresponding to the detected hang state is a first level when a first occurrence of a hang state of an electronic device is detected;
   count a number of occurrences of the hang state of the electronic device within a preset time period from a time point corresponding to the first occurrence of the hang state;
   determine whether the number is greater than or equal to a preset number threshold value corresponding to a second level; and
   determine that the preset level corresponding to the detected hang state is the second level when it is determined that the number is greater than or equal to the preset number threshold value.

8. The device according to claim 7, wherein the processor configured to determine the cleaning mode corresponding to the preset level is further configured to:

determine a first cleaning mode corresponding to the first level when the hang state corresponds to the first level; and determine a second cleaning mode corresponding to the second level when the hang state corresponds to the second level.

9. The device according to claim 6, wherein, when the program types are application programs recorded in a white list, the processing manners are closing or stopping the running application programs, and the processor configured to control running states corresponding to the plurality of application programs running in the memory according to the respective processing manners is further configured to:

determining, from the white list, a preset memory threshold value for the running application program that needs to be closed or stopped, the preset memory threshold value being a memory value that allows the running application program to consume under memory capacity of the electronic device; and closing or stopping the running application program when a memory currently consumed by the running application program that needs to be closed or stopped is greater than the preset memory threshold value.

10. The device according to claim 9, wherein the processor is further configured to:

acquire the white list from a server, wherein the white list is configured to record preset memory threshold values corresponding to a plurality of application programs and obtained by performing statistics under different memory capacities.

11. A non-transitory computer-readable storage medium having stored therein instructions that, when executed by a processor of an electronic device, causes the electronic device to perform a method for cleaning a memory, the method comprising:

determining a preset level corresponding to a detected hang state;

determining a cleaning mode corresponding to the preset level; and cleaning an application program running in the memory according to the cleaning mode;

wherein cleaning the application program running in the memory according to the cleaning mode comprises:

determining respective program types corresponding to a plurality of application programs running in the memory;

determining respective processing manners corresponding to the plurality of application programs in the cleaning mode according to the respective program types; and controlling running states corresponding to the plurality of application programs running in the memory according to the respective processing manners.

* * * * *